United States Patent [19]

Heidmann et al.

[11] Patent Number: 4,503,948
[45] Date of Patent: Mar. 12, 1985

[54] DISC BRAKE THRUST COLLAR ASSEMBLY

[75] Inventors: Kurt R. Heidmann, Fairview Park; Donald A. Vorwerk, N. Olmsted, both of Ohio

[73] Assignee: Allied Corporation, Morristown, N.J.

[21] Appl. No.: 438,191

[22] Filed: Nov. 1, 1982

[51] Int. Cl.³ .......................................... F16D 55/224
[52] U.S. Cl. ...................................... 188/72.8; 92/23; 188/71.1; 384/220
[58] Field of Search ..................... 188/72.8, 72.7, 71.1, 188/196 BA; 71.9; 192/94; 92/23, 27, 28; 384/220

[56] References Cited

U.S. PATENT DOCUMENTS 2,568,858  9/1951  Kovac ............................ 188/71.9 X
3,974,897  8/1976  Pringle .......................... 188/72.8 X
4,022,300  5/1977  Alfanador et al. ............. 188/72.8 X Primary Examiner—Bruce H. Stoner, Jr.
Assistant Examiner—Michael P. Gilday
Attorney, Agent, or Firm—Ken C. Decker; W. N. Antonis

[57] ABSTRACT

A disc brake is actuated through a mechanical linkage comprising a power screw (54) which is rotatably mounted within the housing (22) and a piston or power nut (38) which is threadedly engaged with the power screw (54) and which also is engaged with the friction element (32). An annular thrust collar (70) is installed within the housing (22) and defines a thrust receiving surface (73) which faces a surface (62) on the power screw (54). Brake reaction forces are transmitted to the wall of the housing (22) without loading the bolts (86) in tension by way of the surfaces (62, 73) of the thrust collar (70), the surface (108) and the retaining ring (66). A take-up ring (84) made of a deformable material is carried in the groove (82) of the thrust collar (70) so that, when a brake is manufactured, the thrust collar (70) is first installed in the bore and the retaining ring (66) is then installed in the groove (64). When the brake is first applied, the reaction forces drive the collar (70) into the position illustrated in the drawings, thereby deforming the take-up ring (84) to pass under the retaining ring 66. The take-up ring (84) thereafter assumes its original shape to engage the retaining ring (66) to hold the thrust collar (70) in place. An alternate embodiment discloses an equivalent hydraulic actuator, in which the power screw is replaced by a hydraulic coupling.

5 Claims, 3 Drawing Figures

U.S. Patent  Mar. 12, 1985  4,503,948
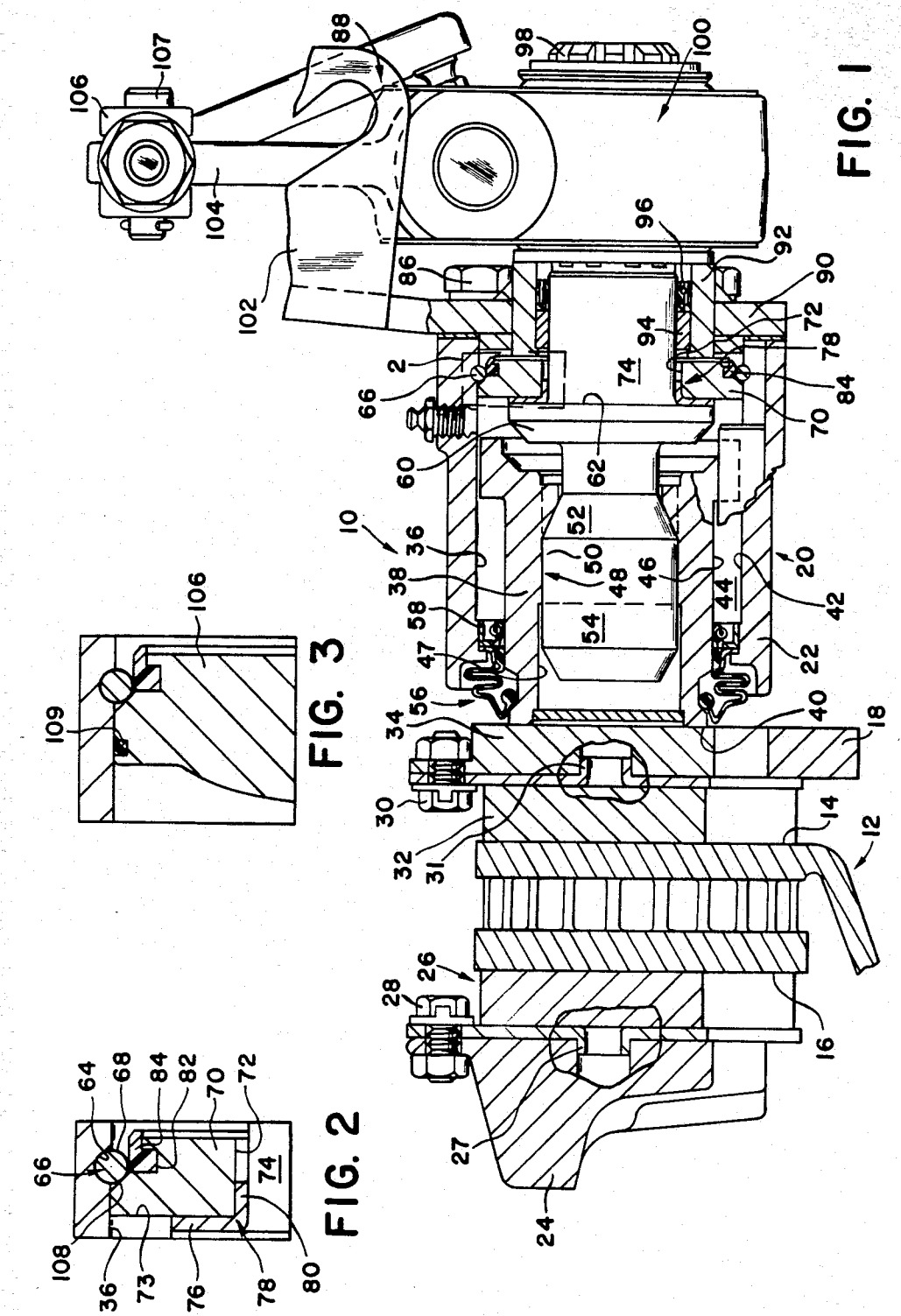
FIG. 1
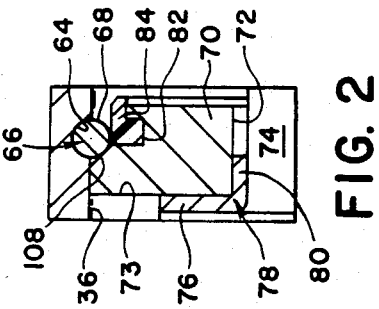
FIG. 2
FIG. 3

DISC BRAKE THRUST COLLAR ASSEMBLY

This invention relates to a disc brake assembly.

Prior art disc brake assemblies comprise a rotor having a pair of friction faces, a pair of friction elements disposed for frictional engagement with the friction faces when a brake application is effected, a caliper assembly supported adjacent the rotor and engaging each of the friction elements for forcing the latter into braking engagement with the corresponding friction faces when a brake application is effected, the caliper assembly including a housing defining a bore therewithin, axial expandable force transmitting means mounted in the bore and operable to cause the friction elements to engage the corresponding friction faces, the bore having an annular wall and a transversely extending means defining one end of the bore, said force transmitting means extending through said bore from said transversely extending means.

Heavy duty disc brakes may be actuated by compressed air. Accordingly, an external actuator is used to effect a brake application through a mechanical linkage. In order to save weight, disc brake calipers of this type can be made as a chordal design in which the caliper bore must be machined as a through hole and the bottom of the hole must be plugged to contain the tension forces exerted on the housing by the piston. Furthermore, relatively heavy fluid pressure actuators must also be supported by the caliper housing. In prior art brakes of this type, the bolts used to mount the external actuator and to attach the transverse wall plugging the bottom of the caliper bore were loaded in tension and shear by the brake reaction forces whenever the brake was actuated. Clearly, the tension loads on the bolts may cause premature bolt failure. Accordingly, it is desirable to avoid loading the assembly bolts in tension with the relatively large brake application forces.

The present invention avoids this problem by transmitting brake reaction forces to the caliper wall so that the bolts attaching the mechanical actuator and the transverse wall closing the caliper bore are never loaded with the brake application forces. This is accomplished by mechanism that does not require adjustment and which facilitates assembly of the brake during manufacture.

Accordingly, the disc brake assembly of the present invention is characterized in that the caliper housing and the force transmitting means include reaction force transfer means for transferring brake reaction forces transmitted through the force transmitting member to the annular wall of the caliper to substantially relieve the transversely extending means from such reaction forces.

Other feature and advantages of the invention will appear in the following description with reference to the accompanying drawings, in which:

FIG. 1 is a longitudinal cross-sectional view of a caliper assembly and actuator therefor made pursuant to the teachings of our present invention;

FIG. 2 is an enlarged cross-sectional view of the circumscribed portion of FIG. 1; and FIG. 3 is a view similar to FIG. 2, but illustrating an alternate embodiment of the invention.

Referring now to the drawings, a disc brake assembly generally indicated by the numeral 10 includes a rotor 12 which is mounted for rotation with the vehicle wheel. Rotor 12 defines oppositely disposed friction faces 14, 16. A torque-taking member 18 is secured to a nonrotating part of the vehicle adjacent the rotor 12 and supports a caliper assembly indicated generally by the numeral 20. The caliper assembly 20 is mounted on the torque-taking member 18 in the manner disclosed in U.S. patent application Ser. No. 375,925 filed May 7, 1982. The caliper assembly 20 includes a housing 22 which includes portions (not shown) straddling the periphery of the rotor 12 and which connect to a radially inwardly extending portion 24 of the housing 22 which is disposed adjacent the friction face 16. Inwardly extending portion 24 supports a friction pad generally indicated by the numeral 26 adjacent the friction face 16. Friction pad 26 is secured to inwardly extending portion 24 by bolt 28 and projections 27. Corresponding bolt 30 and projections 31 secure another friction pad 32 to a support plate 34 which is slidably mounted on the torque-taking member 18 for movement toward and away from the friction face 14.

The housing 22 defines a bore 36 which slidably receives a piston 38 for movement toward and away from the friction face 14. The end face 40 of the piston 38 engages the support plate 34. The bore 36 is provided with at least one longitudinally extending groove 42 which receives a rod 44 which also engages a corresponding longitudinally extending groove 46 on the outer circumferential surface of the piston 38 in order to prevent relative rotation between the piston 38 and the housing 22. The piston 38 defines an inner circumferential surface 47 which is threaded as at 48 to engage corresponding threads 50 on threaded portion 52 of a power screw 54. Because of the threaded connection with the power screw 54, piston 38 acts as a power nut in the transmission of forces to the friction elements 26, 32. A protective boot and retainer assembly generally indicated by the numeral 56 prevent environmental contaminants from entering into the bore 36. A circumferentially extending oil seal 58 backs up the boot assembly 56 and prevents lubricant in the bore 36 from escaping.

The power screw 54 is provided with a radially projecting portion 60 which defines a thrust surface 62 circumscribing the power screw 54. A groove 64 circumscribes the wall of the bore 36 and receives a conventional retaining ring 66 which snaps in the groove 64. The groove 64 is sufficiently shallow that a portion 68 of the retaining ring 66 projects from the wall of the bore. An annular thrust collar 70 circumscribes the bore 36 and defines an aperture 72 and carries a circumferentially extending tapered conical surface 108 that engages the retaining ring 66. The collar 70 defines a thrust receiving surface 73 which faces the surface 62 carried on the power screw 54. Transversely extending portion 76 of an annular thrust bearing 78 is disposed between the surfaces 62, 73. The bearing 78 includes an axial portion 80 that is received within the aperture 72 and supports the portion 74 of the power screw 54. The thrust collar 70 further divides a circumferentially extending groove 82 which circumscribes the thrust collar 70 and which faces the groove 64 in the wall of the bore 36. An annular take-up ring 84 is snapped into the groove 82 and projects therefrom toward the groove 64. The take-up ring 84 is made from nylon or some other material that is relatively easily deformed, yet tends to assume its original shape when load is released.

Bolts 86 secure a bracket 88 to the end of the housing 22. The bracket 88 includes a cover portion 90 which retains a power screw support 92 on the housing 22.

Power screw support 92 defines an opening through which the portion 74 of the power screw 54 extends. A bearing 94 and oil seal 96 support the portion 74 and prevent lubrication from leaking from the bore 36. Portion 74 of power screw 54 terminates in a splined section 98. An automatic slack adjuster 100 of the type shown in U.S. Pat. No. 3,901,357 issued Aug. 26, 1975 to Reitz is mounted on the splined section 98. A conventional fluid pressure actuator (not shown) is mounted on the portion 102 of the bracket 88 and connects with an arm 104 of the slack adjuster 100 by way of yoke 106 and pin 107 so that when the actuator is operated, movement of the arm 104 rotates the power screw 54.

In operation, the aforementioned fluid pressure actuator (not shown) strokes the arm 104 of the slack adjuster 100 when a brake application is effected. Because of the splined connection between the slack adjuster 100 and the power screw 54, rotation of the slack adjuster 100 also rotates the power screw 54. Because of the threaded connection between the power screw 54 and the power nut or piston 38, and since the piston or power nut 38 is prevented from rotating because of the rods 44, rotation of the power screw 54 forces the nut or piston 38 towards the friction face 14, thereby urging the friction pad 32 into frictional engagement with the friction face 14. Movement of the friction pad 32 against the friction face 14 also causes the friction pad 26 to engage with friction face 16, because of the slidable mounting of the caliper on the torque-taking member 18 and because the portion 24 is connected with the housing 22 by bridge portions (not shown) of the housing which extend across the periphery of the rotor 12. Upon release of the brake, the power screw 54 is turned in the reverse direction which, because of the threaded connection between the power screw 54 and the power nut or piston 38, causes the latter to move away from the friction face 14, thereby releasing the brake.

It will be appreciated by those skilled in the art that substantial braking forces are generated by operation of the power screw 54 and the nut or piston 38 when a brake application is effected. Much of this reaction force is transmitted through the power screw 54 to the larger diameter portion 60 of the latter. The force is then transmitted to the thrust collar 70 through the surface 62 the portion 76 of bearing 78 and surface 73. The force is then transmitted to the annular wall of the housing 22 through conical surface 108 of the thrust collar 70 through the retaining ring 66 and into the groove 64. Accordingly, since this relatively high reaction force is transmitted to the wall of the housing 22, the bolts 86 which hold the bracket 88 onto the housing 22 are never loaded in tension by this brake reaction force.

When the disc brake assembly 10 is manufactured, the bore 36 of the housing 22 is first machined from the righthand end of the housing viewing FIG. 1. The power screw 54 and nut or piston 38 are then assembled and installed in the housing. The take-up ring 84 is then installed in the groove 82 of the thrust collar 70, and the thrust collar 70 is then inserted in the bore and placed adjacent to the thrust surface 62. The retaining ring 66 is then installed in the groove 64. After the brake is fully assembled, the brake is actuated once to cause the thrust surface 62 to drive the thrust collar 70 against the retaining ring 66. When this occurs, the take-up ring 84, since it is made of an easily deformable material, is deformed to pass under the retaining ring 66 and then assume its original shape to thereby hold the thrust collar 70 in its proper position within the bore 36.

Referring now to FIG. 3, a modification of the embodiment of FIGS. 1 and 2 is shown for use on hydraulically actuated disc brake calipers. In the embodiment of FIG. 3, the thrust collar 70 is replaced by a transverse wall 106 which carries the groove 82 and take-up ring 84. An annular seal 109 is installed in the outer circumferential surface of the wall 106 for sealing engagement with the wall of the bore 36. Installation and operation of the alternate embodiment of FIG. 3 is the same as that in the primary embodiment of FIGS. 1 and 2, that is, upon assembly of a brake, the wall 106 is installed in the bore 36 and hydraulic pressure is applied thereto when the brake is first actuated to deform the take-up ring 84 to thereby retain the wall 106 in its proper position in the bore. Brake reaction forces are transmitted through the hydraulic fluid to the wall 106 and then to the wall of the bore 36 through the wall 106 and the retaining ring 66.

What is claimed is:

1. Disc brake assembly comprising a rotor having a pair of friction faces, a pair of friction elements disposed for frictional engagement with said friction faces when a brake application is effected, a caliper assembly supported adjacent said rotor and engaging each of said friction elements for forcing the latter into braking engagement with their corresponding friction faces when a brake application is effected, said caliper assembly including a housing defining a bore therewithin, force transmitting means operable to cause said friction elements to engage their corresponding friction faces, said bore having an annular wall and transversely extending means defining one end of said bore, said force transmitting means extending through said bore from said transversely extending means, said housing and said force transmitting means include reaction force transfer means for transferring brake reaction forces transmitted through said force transmitting means to said annular wall to substantially relieve said transversely extending means from said reaction forces, said force transmitting means being an axial expandable mechanical linkage mounted in said bore, said reaction force transfer means including a collar mounted in said bore, means on said force transmitting means for engaging said collar, and means interconnecting the collar and the wall of said bore, said interconnecting means including a groove in said annular wall of said bore and a retaining ring in said groove but projecting from said groove into the wall of said bore to engage said collar, said interconnecting means further including a take-up ring manufactured of deformable material, said take-up ring being carried by said thrust collar and forced against said retaining ring to deform said take-up ring to thereby hold said collar at a predetermined axial position in said housing.

2. Disc brake assembly comprising a rotor having a pair of friction faces, a pair of friction elements disposed for frictional engagement with said friction faces when a brake application is effected, a caliper assembly supported adjacent said rotor and engaging each of said friction elements for forcing the latter into braking engagement with their corresponding friction faces when a brake application is effected, said caliper assembly including a housing defining a bore therewithin, force transmitting means operable to cause said friction elements to engage their corresponding friction faces, said bore having an annular wall and transversely extending means defining one end of said bore, said force transmitting means extending through said bore from said transversely extending means, said housing and said force transmitting means including reaction force transfer means for transferring brake reaction forces transmitted through said force transmitting means to said annular wall to substantially relieve said transversely extending means from said reaction forces, said force transmitting means being an axial expandable mechanical linkage mounted in said bore, said reaction force transfer means including a collar mounted in said bore, means on said force transmitting means for engaging said collar, and means interconnecting the collar and the wall of said bore, said force transmitting means including a rotatable member, said collar defining an aperture coaxial with said collar, and means mounting said rotatable member in said aperture for rotation relative to said housing, said rotatable member including a radially projecting, circumferentially extending surface, said surface engaging said collar to transfer forces from said member to said collar, said force transmitting means including said rotatable member and a nut threadedly connected with said rotatable member, and means holding said nut against rotation relative to said housing whereby rotation of said rotatable member causes said nut to move axially in said housing, said interconnecting means including a groove in said annular wall of said bore and a retaining ring in said groove but projecting from said groove into the wall of said bore to engage said collar, said interconnecting means further including a take-up ring manufactured of deformable material, said take-up ring being carried by said thrust collar and forced against said retaining ring to deform said take-up ring to thereby hold said thrust collar at a predetermined axial position in said housing.

3. Disc brake assembly comprising a rotor having a pair of friction faces, a pair of friction elements disposed for frictional engagement with said friction faces when a brake application is effected, a caliper assembly supported adjacent said rotor and engaging each of said friction elements for forcing the latter into braking engagement with their corresponding friction faces when a brake application is effected, said caliper assembly including a housing defining a bore therewithin, force transmitting means operable to cause said friction elements to engage their corresponding friction faces, said bore having an annular wall and transversely extending means defining one end of said bore, said force transmitting means extending through said bore from said transversely extending means, said housing and said force transmitting means include reaction force transfer means for transferring brake reaction forces transmitted through said force transmitting means to said annular wall to substantially relieve said transversely extending means from said reaction forces, said force transmitting means being an axial expandable mechanical linkage mounted in said bore, said reaction force transfer means including a collar mounted in said bore, means on said force transmitting means for engaging said collar, and means interconnecting the collar and the wall of said bore, said interconnecting means including a groove in said annular wall of said bore and a retaining ring in said groove but projecting from said groove into the wall of said bore to engage said collar, said collar having a force transfer surface for engaging said retaining ring, said force transfer surface extending obliquely with respect to said annular wall.

4. Disc brake assembly as claimed in claim 3, wherein said force transfer surface is a conical surface extending circumferentially around said collar.

5. Disc brake as claimed in claim 2, further characterized in that said collar includes a circumferentially extending conical surface engaging said retaining ring.

* * * * *